United States Patent [19]
Dowdy et al.

[11] Patent Number: 5,508,806
[45] Date of Patent: Apr. 16, 1996

[54] APPARATUS AND METHOD FOR MAKING ROTARY CALIBRATIONS OF A MACHINE TOOL TABLE

[75] Inventors: Cecil R. Dowdy, Campbell; Carol J. Courville, San Jose, both of Calif.

[73] Assignee: Hewlett-Packard Company

[21] Appl. No.: 388,337

[22] Filed: Feb. 13, 1995

[51] Int. Cl.$^6$ ..................................................... G01B 9/02
[52] U.S. Cl. ........................................... 356/363; 356/345
[58] Field of Search ................................... 356/345, 358, 356/363; 250/252.1; 74/821

[56] References Cited

U.S. PATENT DOCUMENTS

| 5,237,390 | 8/1993 | Chaney ................................. | 356/363 |
| 5,341,702 | 8/1994 | Chaney et al. ......................... | 74/821 |

OTHER PUBLICATIONS

HP Application Note 325–2 Machine Tool Calibration Using the HP 5528A Laser Measurement System 5952–7708, Jan. 1990.
A. G. Davis Rotary Calibrator Brochure Cat. No. RC–185–17, undated.
A. G. Davis Circle Divider Technical Catalog Supplement on Absolute Rigidity Catalog CD–2, Sep. 1989.
HP Product Brochure on HP5529A Dynamic Calibrator 5091–4369E, Aug. 1992.
Excerpts from Laser and Optics Users Manual, printed Jan. 1992, Manual Part No. 05517∝90033 from Hewlett–Packard Company.
Product Data Sheet from Carr Lane Manufacturing Co. on Stainless Spring Plungers, May 1985.
Product Data Sheet from Federal Products Co., A–384, 1992.

*Primary Examiner*—Samuel A. Turner
*Assistant Examiner*—Robert Kim

[57] ABSTRACT

When combined with a conventional angular-measuring, dual-beam-laser interferometer system, the present invention is useful for making rotary calibrations of a CNC (Computer Numerically Controlled) machine tool having a rotary machine tool table and associated tool spindle. The invention includes a bracket connected to an industry standard rotary indexing calibrator having upper and lower disks which are rotatable with respect to one another and which are connected to one another via a Hirth coupling. A reflecting element of the interferometer system for measuring angular position is preferably rigidly mounted to the bracket which in turn is connected to and rotates with the upper disk of the indexing calibrator. The lower disk of the indexing calibrator is mounted to the rotary machine tool table.

18 Claims, 6 Drawing Sheets

APPARATUS AND METHOD FOR MAKING ROTARY CALIBRATIONS OF A MACHINE TOOL TABLE

BACKGROUND OF THE INVENTION

1. Field of the Invention

This invention relates to machine tool calibrations, and more particularly, to the calibration of the angular positioning ability of a machine tool table when used in combination with a conventional laser interferometer metrology system.

2. Description of the Prior Art

Machine tools such as but not limited to CNC (Computerized Numerical Controller) milling machines and lathes are well known devices for shaping solid pieces into manufactured parts. As the complexity and tolerances of such parts increase, the calibrations of the positional accuracy for such machine tools must likewise increase. The present invention is useful for making rotary calibrations of CNC machine tools of the type having a table which rotates to prescribed angular positions about a rotary axis normal to the table.

It is well known to make rotary axis calibrations of the CNC machine tool table via a combination of an angular position-measuring laser interferometer system and an indexing rotary calibrator having a so-called Hirth coupling. The indexing rotary calibrator (also known as an indexing rotary table or a circle divider) typically includes upper and lower disks (platens) mounted on a common shaft so that one or both of the disks can rotate about the shaft. The disks are also mounted to move longitudinally back and forth on the shaft relative to one another. On each opposing face of the disks, there is a circular periphery of serrated teeth which precisely mate against one another to form the so-called Hirth coupling when the disks are locked (engaged) together. Each tooth is formed with great precision and the total number is chosen so that the angular positioning of the disks with respect to one another can be within a prescribed high level of tolerance. A standard model rotary calibrator is available from the A. G. Davis Gage and Engineering Company of Hazel Park, Mich., having a coupling indexing accuracy of ±0.2 arc second. Other available models have indexing accuracies that range from 0.4 to 1.0 arc second. Another vendor of indexing rotary calibrators is the AA Gage Division of Baldwin, Inc., located in Ferndale, Mich.

Angular position-measuring laser interferometer systems are also well known for making accurate measurements of changes in rotary positions. The HP 5528A Laser Measurement System and the HP 5529A Dynamic Calibrator, which are products made and sold by the Hewlett-Packard Company, the assignee of the present invention, are devices capable of making position measurements well within the modern tolerances desired for machine tools. However, since the optics of the interferometer systems have a limited angular range for a fixed setup, such systems are not suited for making full 360 degree rotary calibrations. In addition, measuring errors accumulate and become larger as the angular distance traveled by the measuring optics increases so that such laser interferometer products are most suited for measuring relatively small angular excursions and are not suited for relatively large angular distances such as would be needed for a full 360 degree calibration of rotation.

The combination of an indexing rotary calibrator with a laser interferometer measuring system is an assemblage known in the prior art for making rotary calibrations of machine tool tables. Typically, rotary calibrations using such commercially available assemblages are usually conducted in the following manner. The lower disk of the calibrator is fixed to the rotary machine tool table being calibrated and the upper disk is held fixed in angular position either by an operator making the calibration or by an external arm mounted in a location not affected by rotary movement of the machine tool table. The axis of rotation of the calibrator disks coincides with the axis of rotation of the machine tool table. The laser interferometer system is set up so that a portion of the optics for measuring angular excursions is coupled to the upper disk. After the indexing rotary calibrator and the laser interferometer measuring system are both put into a predetermined zero initial position, the calibrator is unlocked (that is, the Hirth coupling is disengaged). The machine tool table is then moved to a prescribed rotary position to be calibrated while the upper disk is held in its fixed angular position. Next, the two disks are subsequently locked together. Since the lower disk is fixedly mounted to the machine tool table, any rotation of the upper disk off of its initial zero position as it re-engages the lower disk is the amount of angular error between the prescribed rotary position of the machine tool table and the actual position. Because a portion of the laser interferometer optics is fixed to the upper disk, any corresponding angular motion of the optics is measured by the laser measuring system and a calibration reading can thus be made. Of course, the error measurement is subject to the tolerances existing in the Hirth coupling and the laster interferometer system. The above-described procedure is then repeated for each of the respective angular positions to be calibrated.

A typical calibration standard requires calibration readings to be obtained at 10 degree segments over the 360 degree range of rotary motion and for each of the resulting 36 readings to be repeated at least 6 times. As can be understood and is well known, when the above-mentioned calibration procedure is conducted manually, much time and tedium is involved. With the rising costs of labor, such time also means more expense associated with making such important rotary calibrations.

In an effort to reduce the time, there are prior art commercially available mechanized assemblages which have pneumatic, hydraulic, or electrically motorized mechanisms for locking and unlocking the upper and lower disks of the indexing rotary calibrator. Other commercial assemblages include disks that are servo controlled. By using a programmable computer and associated interface equipment for controlling the indexing rotary calibrator, for inputting commands to the machine tool table, as well as for collecting data from the laser interferometer measuring system, the process for making rotary calibrations is known to contain a high degree of automation. However, such mechanized assemblages are substantially more complicated and thus more expensive than the manually operated rotary indexing calibrator. In order to protect the relatively expensive Hirth coupling from damage as the serrated teeth are locked or unlocked, elaborate safety measures and devices must be included to prevent inadvertent damage. Moreover, with the higher complexity of such mechanized assemblages come attendant problems of reliability and repeatability. Oftentimes because of limited budgets or expense reduction programs, there is a tradeoff between cost and calibration accuracy.

SUMMARY OF THE INVENTION

The above mentioned limitations of devices and assemblages known in the prior art are overcome by the provision of a new and improved apparatus made in accordance with the teachings of the present invention when it is used in combination with an associated tool holding spindle and a conventional angular position-measuring laser interferometer system. The present invention includes a bracket, connecting member, a special connecting mounting, and a conventional rotary indexing calibrator of the type having upper and lower disks rotatably mounted on a common shaft and connected together via a Hirth coupling. In a preferred embodiment, the upper disk is movably mounted on the common shaft for motion toward and away from the lower disk along a longitudinal axis to disengage and engage the Hirth coupling. The bracket is fixedly connected to upper disk and thus rotates in unison with any motions of the upper disk. The lower disk of the calibrator has a mounting for fixed connection to the rotary table at a location where the axis of rotation of the lower disk substantially coincides with axis of rotation of the machine table.

The conventional CNC machine tool includes a spindle having a chuck or tool holding device. The connecting member of the present invention has one end adapted so that it will rigidly held by the chuck. The other end of the connecting member is coupled to the upper part of the bracket via the special connecting mounting. When the present invention is coupled to the spindle and the rotary table, a back and forth translational motion of the spindle and the associated motion of the upper disk along a direction parallel to the rotary axis of the rotary table will result in the Hirth coupling to be respectively disengaged and engaged. The special mounting is so arranged and constructed that when the Hirth coupling is disengaged by translational motion of the spindle, both the bracket and upper disk are rigidly connected to the connecting member and both are restricted from rotating about the longitudinal axis of the calibrator. When the Hirth coupling is being engaged by translational motion of the spindle in a direction opposite to that for disengaging the Hirth coupling, the special mounting releases the bracket so that the upper disk if free to pivot and rotate as needed to become fully and precisely registered with the lower disk without damaging the serrated teeth of the Hirth coupling.

In a conventional laser interferometer measuring system, angular position is measured by detecting changes of the rotary positions of a reflecting element. In the preferred embodiment of the present invention, the bracket is adapted for rigidly holding the reflector element. When the present invention is used in combination with the laser interferometer system for calibrating the rotary positioning ability of the machine table, the upper and lower disks are first positioned at a predetermined zero angular reference index and Hirth coupling is engaged. After the Hirth coupling is disengaged by appropriate motion of the spindle, the rotary table and lower disk rigidly connected thereto are moved in unison to a prescribed angular position. When the Hirth coupling is disengaged, the special mounting and the spindle in combination will inhibit the bracket from rotating when the rotary table and the lower disk attached thereto are moved in unison to the prescribed angular position to be calibrated. After the spindle and the bracket are then moved in a direction to engage the Hirth coupling and the upper and lower disks become registered with one another, the special mounting releases so that bracket, upper disk, and reflecting element are free to rotate in unison as needed when the Hirth coupling becomes fully engaged. Since the reflecting element mounted to the bracket was also initially at the zero reference index, any subsequent rotation away from that reference index is detected by the interferometer system as an error between the actual and prescribed rotary positions when the Hirth coupling is fully engaged for a calibration reading. The preferred embodiment of the present invention is particularly useful for making precise and final measurements (for example, within fractions of an arc second) of the rotary positioning error of the rotary table. Gross errors (e.g, within the nearest degree) can be detected without the use of the laser interferometer system since the conventional indexing rotary calibrator is sufficiently accurate to measure such gross errors. In one embodiment of the present invention, a rotary scale is imprinted on the periphery of one the two disks with a stationary pointed affixed to the other disk. Accordingly, the gross errors which may occur in a rotary calibration session are measured by conventional means such as by visually reading the amount of rotation of the rotary scale with respect to the pointed.

The features and advantages of the present invention will be better understood in view of the following detailed description of the preferred embodiments given in connection with the appended drawings. It should be pointed out that the same reference numerals depicted in the various figures refer to the same elements of the present invention.

DETAILED DESCRIPTION OF THE PREFERRED EMBODIMENTS

Figure 1:
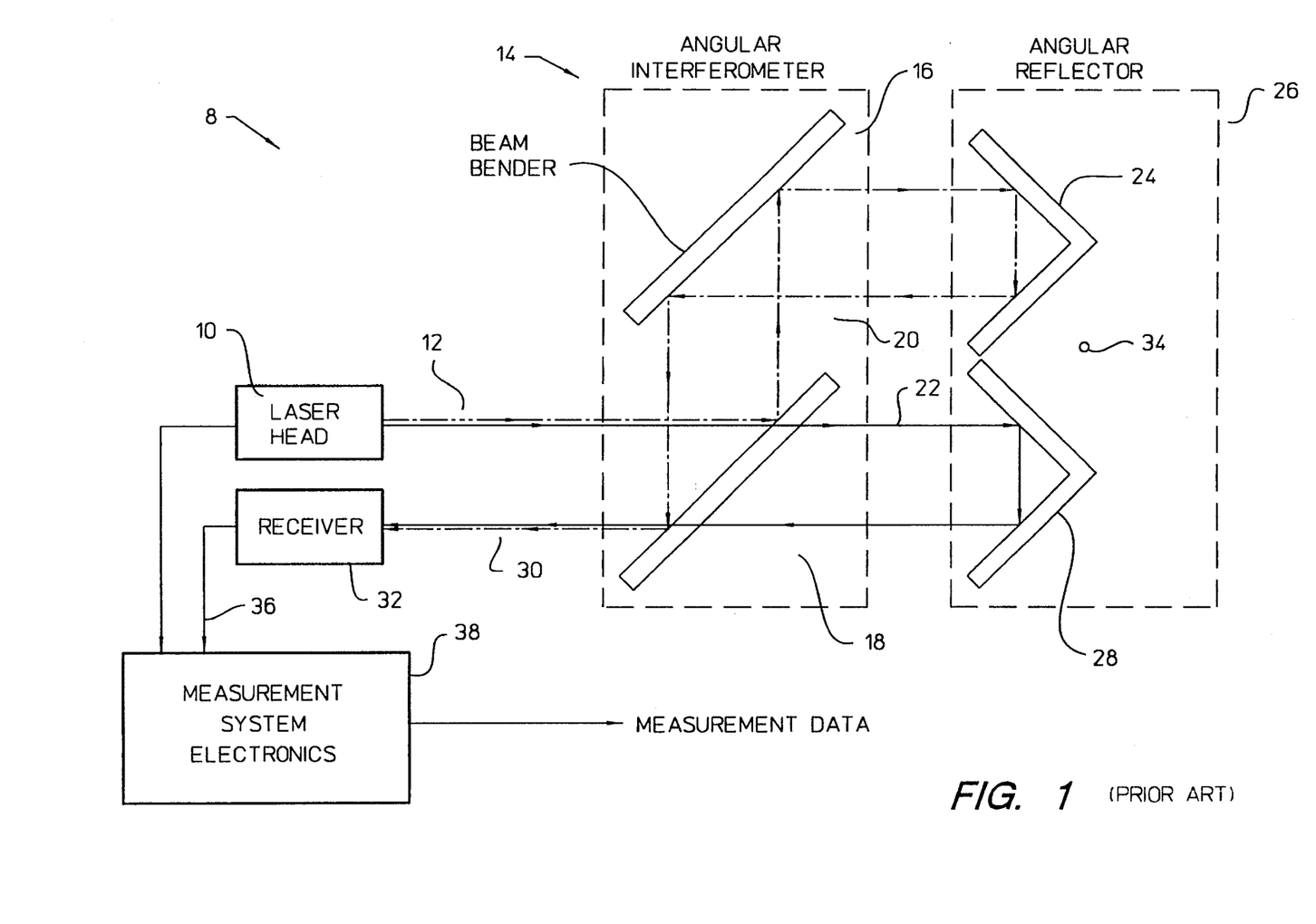
FIG. 1 is a schematic and block diagram of a conventional laser interferometric system for measuring angular position.
Figure 2:
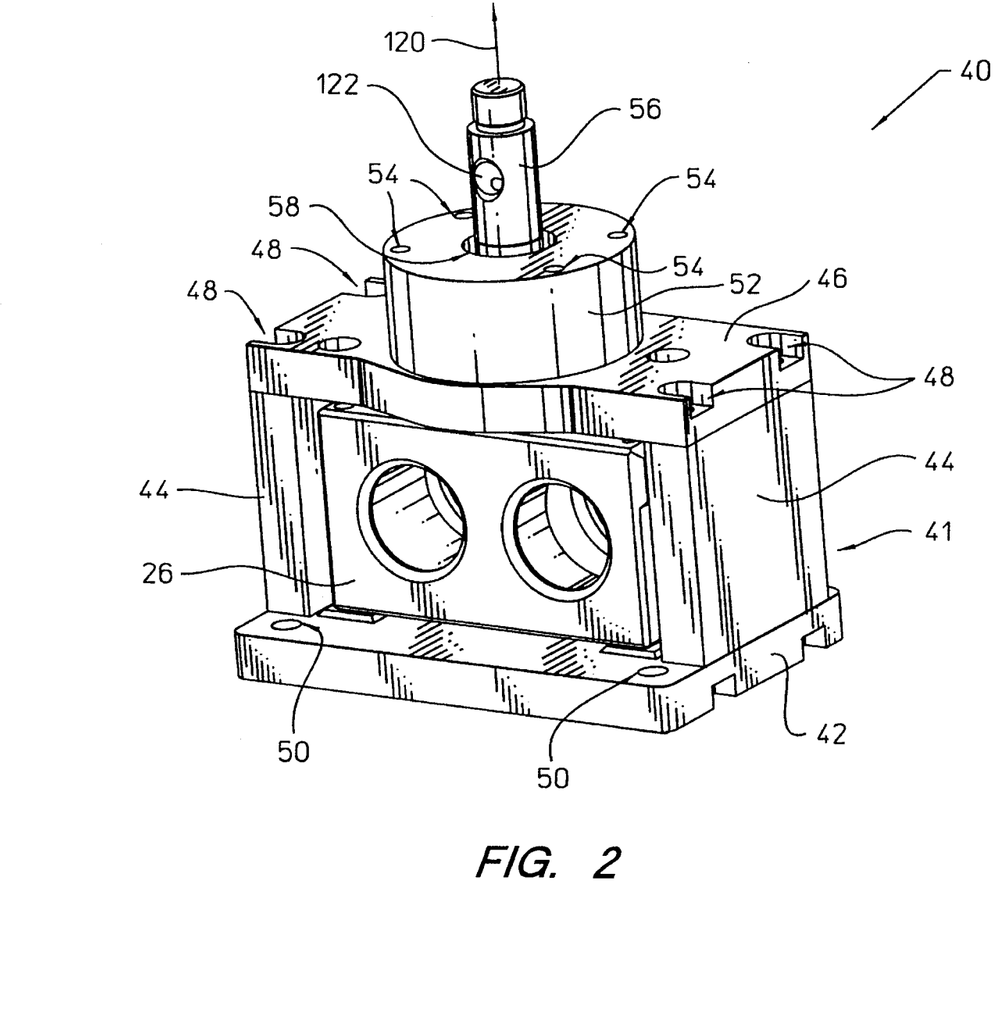
FIG. 2 is a perspective view of a top housing portion of the present invention to which is mounted a reflector element from the laser interferometer system depicted in FIG. 1.

Before describing the preferred embodiments of the present invention, it would be instructive to understand the basic operation of a conventional angular, position-measuring interferometer system so that use of the present invention can be more clearly understood. Shown in FIG. 1 is a schematic and block diagram of a prior art angular-position measuring laser interferometer system 8. A laser head 10 generates a light beam 12 having two frequencies $f_A$ and $f_B$ for transmission to an angular interferometer 14. The beam 12 passes through beam bender 16 to polarizing beam splitter 18 which reflects a first portion 20 of the beam having frequency (or polarization) $f_A$ and transmits a second portion 22 having frequency (or polarization) $f_B$. The first portion 20 of the beam 12 is reflected by beam bender 16 towards a cube corner (or retroreflector) 24 of an angular reflector 26 and subsequently returned through beam bender 16. The second portion 22 is transmitted to cube corner (or retroreflector) 28 for reflection back to through the beam splitter 18, where it is combined with the returning first portion 20 (as that beam passes through the beam bender 18) to form a combination beam 30 that is sent to a receiver 32. As can be understood from inspection of FIG. 1, if the angular reflector 26 is rotated from one angular position to another about an axis preferably passing though a center point 34 and normal to the plane of the figure with the angular interferometer 14 fixed in position, the optical paths traversed by the respective first and second portions 20 and 22 of the beam 12 will change. As is well known, the change in the optical path traversed by each portion of the beam 12 will be manifested as frequency shifts up or down (which is the so called Doppler shift), depending upon the direction and velocity of the rotation. The frequency shifting which occurs in the combined beam 30 is detected by receiver 32 which produces an associated detection signal 36 that is sent to measurement system electronics 38. The use of a light beam having two different frequencies is preferred because the distance information is carried on so-called ac waveforms, or carriers, rather in dc form. As is well known, the advantage of using ac waveforms is that they are insensitive to changes in dc levels so that changes in beam intensity will not be interpreted as a change in distance to or motion of the object being measured.

The electronics 38 responds to the detection signal to produce a measurement data signal that corresponds to a measurement of the change in angular position of the angular reflector 26. Conversely, a similar shifting of frequencies occurs if the angular interferometer 14 is rotated in the plane of the figure with the angular reflector 26 held stationary.

Figure 6:
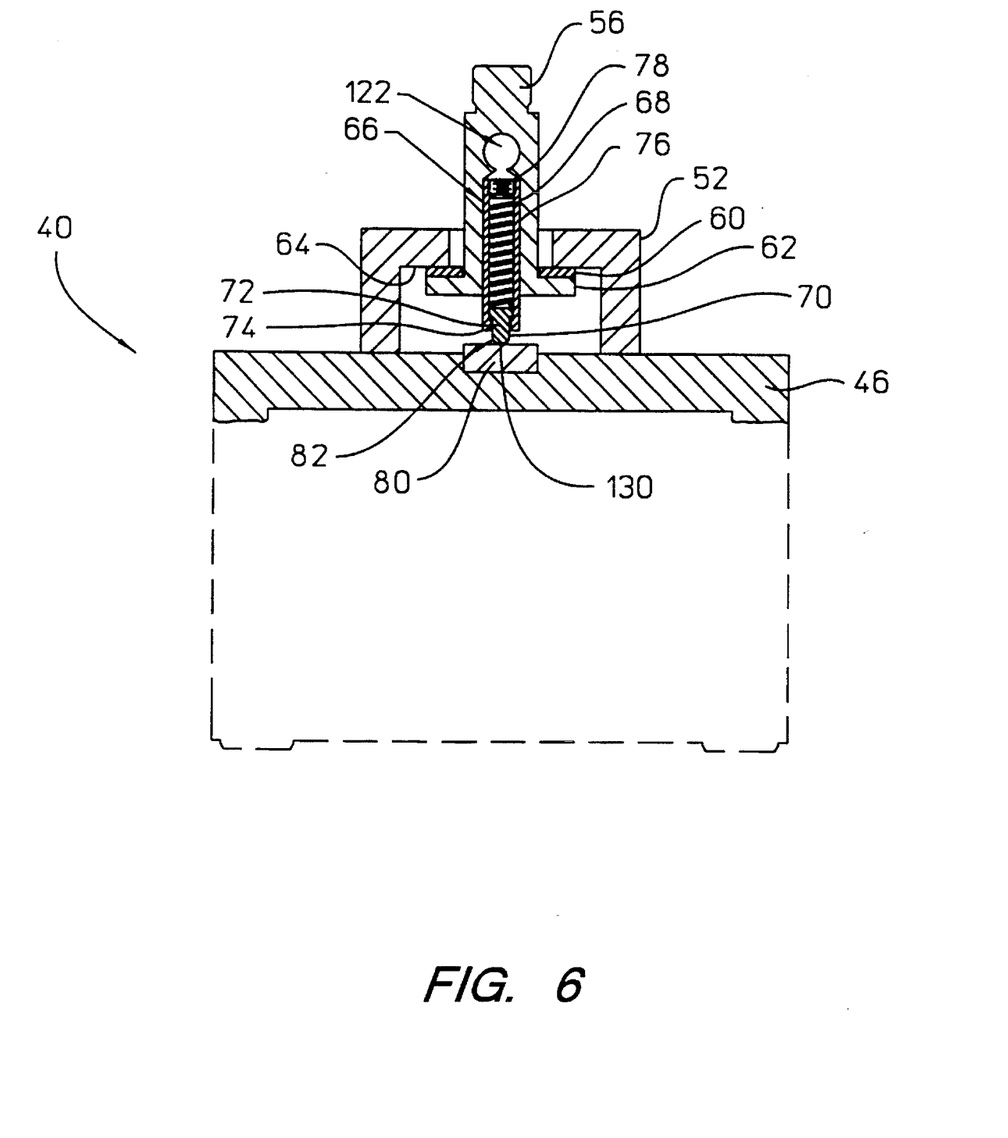
FIG. 6 is a partial cross-sectional view of the top housing portion of the present invention that is taken along sectional lines A—A in FIGS. 4–5.

FIGS. 2–5 show the perspective, plan, side and top views respectively of a top housing 40 of the present invention to which is mounted the angular reflector 26 (previously described in connection with FIG. 1). FIG. 6 depicts a partial cross sectional view of the present invention taken between section line A—A of FIG. 4. With reference to FIGS. 2–6, a rectangular box 41 is formed with a base 42, side walls 44 and a top piece 46. Except as noted, the items comprising the preferred embodiment of the present invention are fabricated using metal. The top piece 46 is fastened to the side walls 44 with threaded bolts (not shown) placed through openings 48. The base 42 is similarly fastened to the side walls 44 via bolts (not shown) placed openings 50 in the base 42. The reflector 26 is fixedly mounted to the base 42 preferable via three bolts (not shown).

A cover piece 52 which in a working model of the present invention is preferably cylindrical in shape and bolted to the top piece via openings 54. A vertical shaft 56 is disposed through a shaft opening 58. Depicted in FIG. 6 are further details of what is inside the cover piece 52. An elastomeric washer 60 is disposed between a flange 62 formed at one end of the vertical shaft 56 and an inside surface 64 of the cover piece 52. A spring plunger assembly 66 is mounted within the vertical shaft 56 and held in place via threads 68. A nose 70 disposed within the plunger assembly 66 is formed with a flat surface 72 which is urged to move towards a stop 74 by one end of a spring 76. The opposite end of spring 76 is held in against a set screw 78. When the cover piece 52 containing the shaft 56 and the plunger assembly 66 is mounted onto the top piece 46, the flat surface of nose 70 is urged against the spring 78 in a direction towards the set screw 78. The spring 78 is thus put into compression and generates a force to keep the nose 70 against a bearing block 80 mounted in the top piece 46. The bearing block 80 is a made of a hardened material for withstanding the wear produced by the abrasion from the nose 70. As will be explained in more detail later, it is desirable for a contact area 82 where the nose 70 contacts the bearing block 80 at a contact point 130 to be flat and be able to resist being worn into a concave depression that may hinder operational movement of the nose 70.

In a working embodiment of the present invention, the plunger assembly 66 was a commercially available prior art product purchased from the Carr Lane Manufacturing Co., of St Louis, Mo. In particular, it was a so-call heavy force stainless spring plunger having a ¼–20 thread, initial and end forces of 3 and 13 pounds respectively, a body length of 1.0 inch, and a plain stainless steel nose which is formed with a rounded tip. The nose of this spring plunger had an at-rest exposed length of 0.187 inch and a diameter 0.119 inch.

Figure 3:
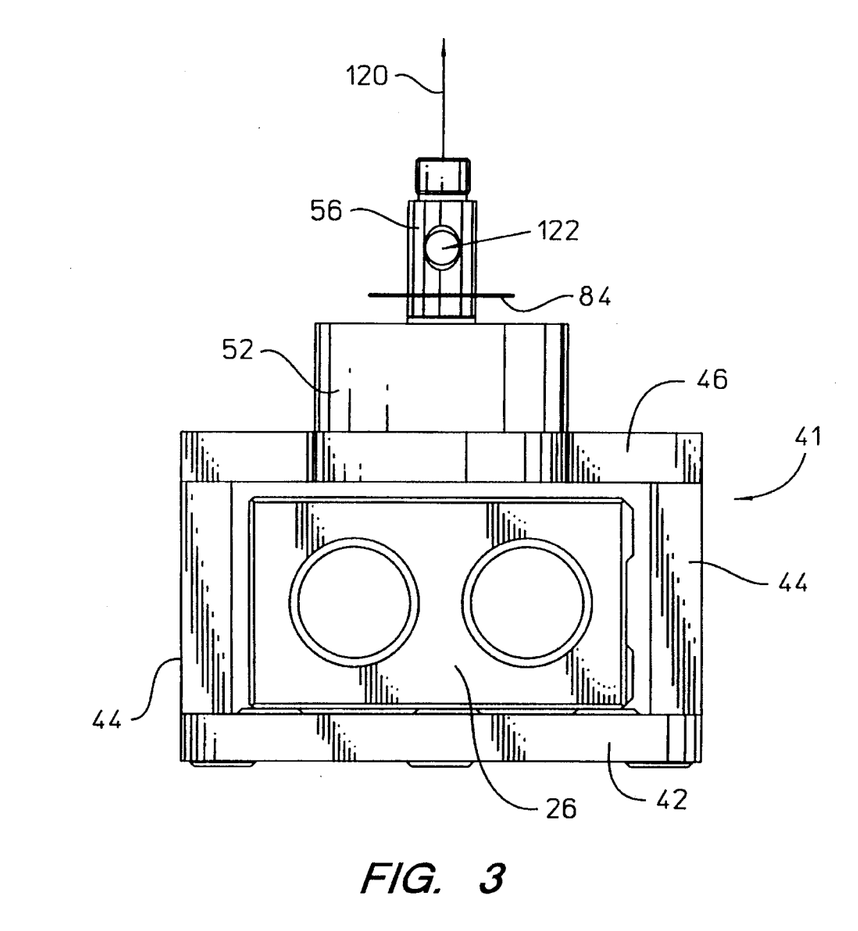
FIG. 3 is a plan view of the top housing portion of the present invention depicted in FIG. 2.
Figure 4:
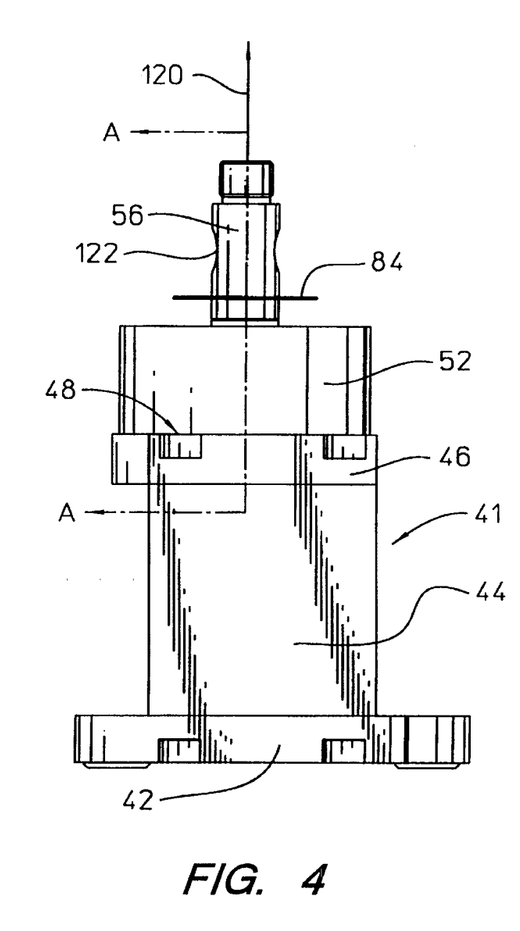
FIG. 4 is a side view of the top housing portion of the present invention depicted in FIG. 2.
Figure 5:
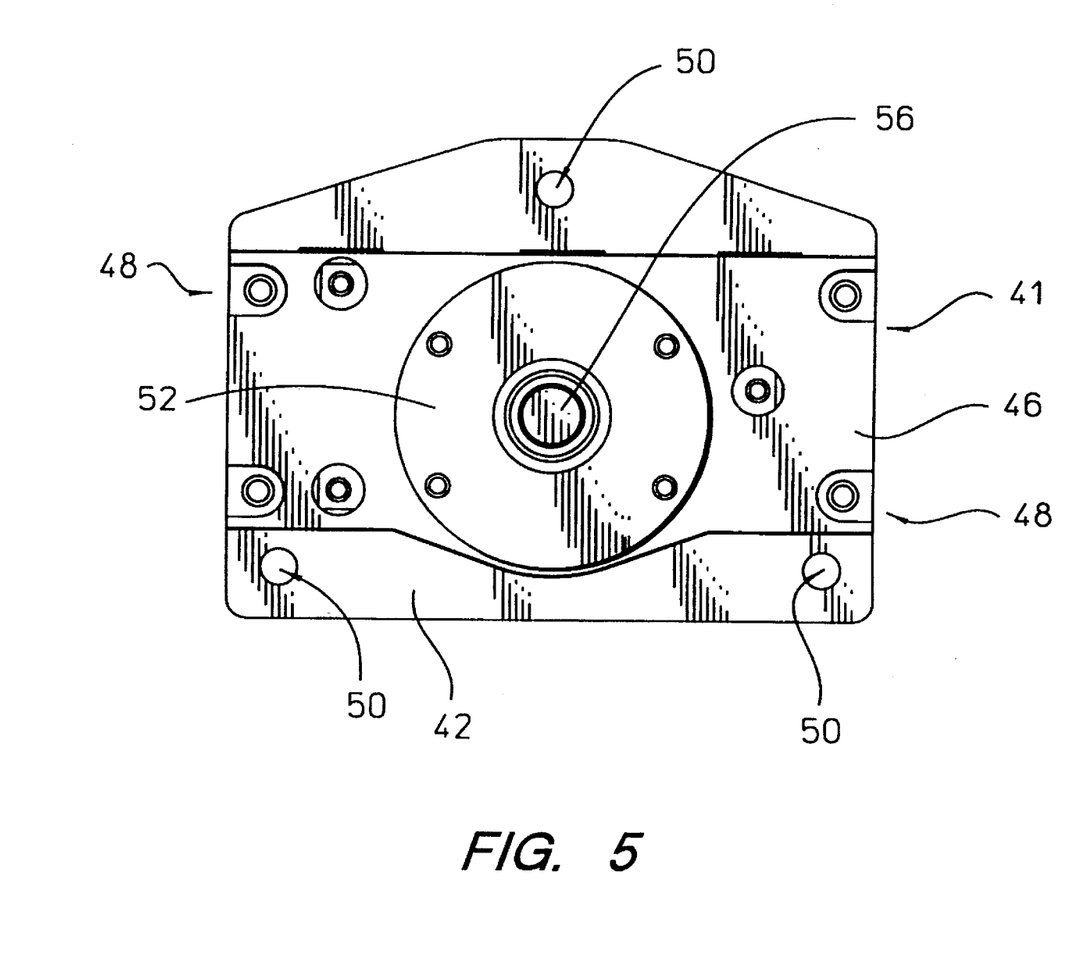
FIG. 5 is a top view of the top housing portion of the present invention depicted in FIG. 2.

Regarding FIGS. 3–4, a blocking washer 84 is shown mounted on the vertical shaft 56. The purpose of the blocking washer 84 will explained later. Although not shown in FIGS. 2, 5 and 6, the blocking washer 84 is an item desired for use in a preferred embodiment of the present invention.

Figure 7:
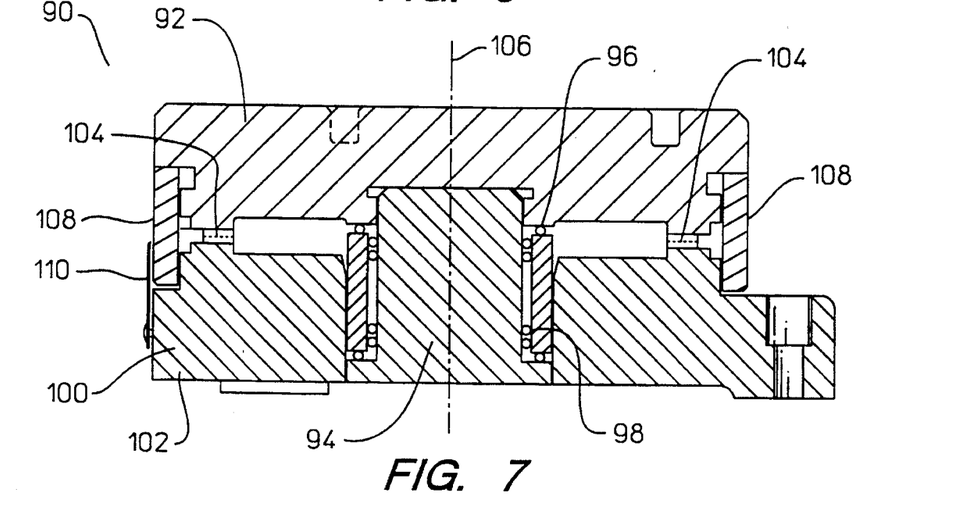
FIG. 7 is a cross-sectional view of a rotary indexing calibrator used in combination with the top housing portion of the present invention depicted in FIGS. 2–6.

FIG. 7 depicts a sectional plan view of a conventional indexing rotary calibrator 90 which is part of the present invention. An upper disk 92 is mounted for rotation about and movement along a central shaft 94. Although roller bearings 96 and 98 are shown for a preferred embodiment of the present invention, other bearing arrangements may be used, such as a sleeve bearing without any roller bearings. A lower disk 100 is preferable formed as an integral part of a base 102. A conventional Hirth coupling 104 (specific details are not depicted) connects the upper disk 92 with the lower disk 100 around a periphery region between the upper and lower disks. As shown in FIG. 7, the Hirth coupling is engaged. However, the upper disk 92 is movable along a longitudinal axis 106 so that the Hirth coupling is disengaged and the two disks are separated from one another. Around an outer periphery of the disk 92 is a graduated ring 108 having a scale for indicating angular rotation with respect to a pointer 110 affixed to the lower disk 100.

Figure 8:
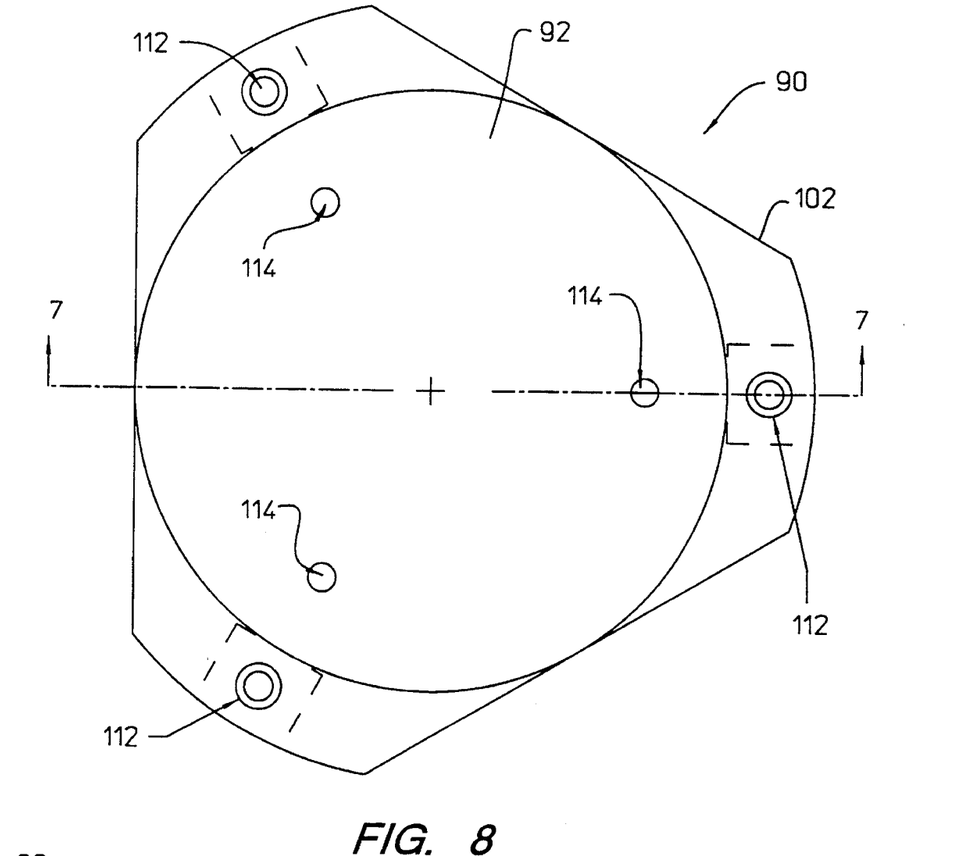
FIG. 8 is a top view of the rotary indexing calibrator depicted in FIG. 7.

FIG. 8 shows a top view of the indexing rotary calibrator depicted in FIG. 7. The base 102 preferably includes three mounting holes 112 which are usable for mounting the rotary table of a machine tool such as a milling machine. The upper disk 92 includes holes 114 that are used for mounting the top housing (of FIGS. 2–6) via mounting holes 50. In a preferred embodiment, the upper disk is 5 inches in diameter and the Hirth coupling is accurate to 0.25 arc-second.

A description will now be presented regarding the use of the present invention for making rotary calibrations of a machine tool table. When the top housing 40 is mounted to the upper disk 92 of the indexing rotary calibrator 90, the longitudinal axis 106 of the indexing rotary calibrator is preferably coincident with a shaft axis 120 extending along the center of the vertical shaft 56. When the present invention is used in combination with the laser interferometer system 8 for making calibrations of the angular position capability of the CNC machine tool table, the axis of rotation of the machine table preferably coincides with the shaft axis 120 (shown in FIGS. 2–6) and the longitudinal axis 106 (in FIG. 7). The CNC machine tool has a computer controlled spindle which includes a chuck for holding the appropriate tool used to shape the raw piece into a finished item of manufacture. The spindle typically has many degrees of movement, including motion toward and away from the machine tool table along a direction normal to the machine tool table. When the present invention is fully set up for making rotary calibrations of the machine tool table, the vertical shaft 56 is rigidly mounted to the spindle. In a preferred embodiment, a hole 122 (shown in FIGS. 2–4 & 6) in the vertical shaft 56 is usable for holding a rod (not shown) placed therethrough if there is a need keep the present invention stationary when it is being mounted into the chuck of the spindle.

With reference to FIGS. 1–8, when the rotary axis calibration of the CNC machine tool table is begun, the upper and lower disks 92 & 100 of the indexing rotary calibrator 90 are first set to a prescribed initial position, preferably at the zero mark of the graduated ring 108 with respect to the pointer 110. The Hirth coupling 104 is engaged so the two disks are kept in their prescribed position. In addition, the laser interferometer system 8 is set at the prescribed initial position. Next, the spindle is commanded to move to a location away from the machine tool table which results in the upper disk 92 being separated from the lower disk 100 and the Hirth coupling 104 being disengaged. The machine tool table is then commanded to rotate to a prescribed angular position which is, for example for illustration purposes, 10 degrees. The upper disk 92 does not rotate since the Hirth coupling 104 is disengaged. Any drag forces which may be passed by friction in the bearings 96 & 98 to rotate the upper disk 92 as the lower disk 100 is rotated is resisted by the combination of the spindle holding the vertical shaft 56 and frictional resistance generated by the elastomeric washer 60. As further explanation, it was previously mentioned that the plunger assembly 66 is disposed so that the nose 70 is forced against the bearing block 80. The force generated by the plunger assembly 66 also acts upon the elastomeric washer 60 which in turn produces a frictional resistance force more than sufficient to resist any drag forces which may be produced by the bearings 96 & 98.

After the lower disk 100 is rotated to the 10 degree location, the spindle is then commanded to move towards the machine tool table and the Hirth coupling is then reengaged. If there is no error, the teeth of the Hirth coupling 104 will engage precisely and the laser interferometer system 8 will not detect any rotational movement of the angular reflector 26. The pointer 110 will also be at the ten degree indication of the graduated ring 108. However, if there is an error, the laser interferometer system 8 will detect some angular movement of the angular reflector 26.

It is known that each tooth (not shown) of the Hirth coupling has angled sides and all of the teeth of each disk forms a gear. If the angular error of the machine tool table when it is commanded to move to the ten degree position is such that the teeth of the Hirth coupling do not precisely mesh when the upper disk 92 is placed back onto the lower disk 100, damage to the relatively expensive Hirth coupling 104 is possible since the spindle is capable of generating large forces needed for making manufactured parts. If such situation does arise, the top housing 40 is constructed and arranged to avoid damage to the teeth of the Hirth coupling 104. More specifically, the force produced by the spring 78 in the plunger assembly 66 is chosen to be less than that which will damage the Hirth coupling 104. Accordingly, if the upper disk 92 must tilt somewhat so as to accommodate the situation where the teeth of the Hirth coupling 104 do not precisely mesh, the rectangular box 41 will pivot about the nose 70 at the contact point 130 before any damage occurs in any of the teeth. It should be pointed out that the shaft opening 58 is sized to permit the rectangular box 41 and the cover piece 42 (rigidly fixed to the top piece 46) to tilt without contacting any portion of the vertical shaft 56.

At the same time, any rotation of the upper disk 92 that is needed in order for the teeth of the Hirth coupling 104 to mesh precisely is also permitted. This result is possible because the force of the spring 78 and the frictional resistance of the elastomeric washer 60 are chosen such that the rectangular box 41 will rotate about the vertical shaft 56 before any damage occurs in the Hirth coupling 104. More particularly, if the teeth of the Hirth coupling do not mesh precisely, a force is produced as the angled sides of each tooth are pressed against one another as the spindle moves the upper disk 92 towards the lower disk 100. This force is transmitted via the nose 70 and acts to further compress the spring 78. When the transmitted force begins to exceed the spring force produced by the compression of the spring 78, the force acting to keep the elastomeric washer 60 and flange 62 against the inside surface 64 of the cover piece 52 will diminish towards zero magnitude. The spindle will keep the vertical shaft 56 from rotating. As a result, the rectangular box 41 will be free to rotate as needed in reaction to the rotational forces generated as the teeth of the Hirth coupling mesh. Since the point of contact between the nose 70 and bearing block 80 is where the rotation occurs, it can be understood why the nose 70 is rounded (instead of being flat) to reduce the area of contact and why it is desirable for the bearing block 80 to made of a hardened material for resisting abrasion from the nose 70. If the nose 70 wears a concave depression in the bearing block 80, the pivoting and rotational ability of the rerctangular box 41 can be adversely affected.

After the calibration process is completed for the ten degree position, the entire procedure described above can then be repeated for the next position, e.g., at the twenty degree location. Since the spindle and machine tool table are usually under programmable control, the entire calibration process can be automated, assuming the appropriate interface equipment and computer programs are used for interfacing and controlling machine tool and the laser interferometer system.

It is well known that the laser interferometer system 8 is ideally suited for measuring relatively small changes in angular position, such as, for example by way of illustration, changes of less than one degree. If the rotary positioning error of the machine tool table is relatively large (such as, for example by way of illustration), such inaccuracy can be detected by use of the graduated ring 108 in the indexing rotary calibrator 90. In this latter case, the laser interferometer system 8 is not needed until such relatively large errors are first eliminated.

There are situations where oil or other unwanted contaminants may flow down from the spindle along vertical shaft 56 and possibly interfere with the operation of the present invention. In such case, the blocking washer 84, preferably made of polyurethane, is used to prevent the unwanted oil or other contaminants from adversely the operation of the present invention.

Although certain embodiments of the present invention have been describe in detail above, the present invention is certainly not limited by those embodiments and preferred arrangements. Those of ordinary skill in the art will recognize that changes may be made to form and detail without departing from the scope of the present invention. For example, the top housing 40 can be constructed to mount the angular interferometer 14 of the laser interferometer system 8 instead of the angular reflector 26. In such alternative case, the angular interferometer 14 will rotate with the top housing 40 and the angular reflector 26 is kept stationary. Other angular position-measuring optical systems can be used in place of the preferred system using the so-called ac waveforms of laser light. Even though the preferred embodiments are all described in connection with a horizontal machine tool table, the present invention will operate with equipment such as lathes where the machine tool table is vertical or at some angle between horizontal and vertical. As a result, the scope of the present invention is limited only insofar as defined by the appended claims and includes all equivalents thereof.

We claim:

1. An apparatus for use in combination with a machine tool assemblage as a workpiece and an angular position-measuring assembly as another workpiece for making rotary axis calibration of the machine tool assemblage;

the machine tool assemblage including:
a machine table operable for rotating around a rotary axis and having an accessory mounting; and
a tool spindle operable to move back and forth along a direction parallel to said rotary axis while maintaining a fixed rotary position, and including a tool holder;

the angular position-measuring assembly including a component for coupling to the machine table and for measuring differences between an actual angular position of and a prescribed angular position for the machine table;

said apparatus comprising:
an indexing calibrator having upper and lower elements for rotating about a longitudinal axis of the calibrator and for being connected to one another via a rotary coupling for precise rotary positioning of the elements with respect to one another; the upper element being disposed for moving along the longitudinal axis and for engaging and disengaging the rotary coupling; the lower element having a mount for fixed coupling to the accessory mounting of the machine table;

a bracket having a mount for fixed coupling to the component of the angular position-measuring assembly and further including top and bottom surfaces; the bottom surface being coupled to the upper element of the calibrator;

a connecting member having near and distal ends; the distal end being adapted for fixed coupling to said tool holder; and a connecting member mounting for coupling the near end of the connecting member to the top surface of the bracket; the connecting member mounting being so constructed and arranged that the bracket is (a) restrained from rotating about the longitudinal axis when the rotary coupling of the indexing calibrator is disengaged, and (b) permitted to rotate about the longitudinal axis when the rotary coupling of the indexing calibrator is in the process of being engaged;

wherein said apparatus when used for rotary calibration is disposed such that the connecting member is coupled to the tool holder, the component is coupled to the bracket, the indexing calibrator is coupled to the machine table with the longitudinal axis of the calibrator being substantially coincident with the rotary axis of the machine table, and the back and forth motion of the spindle respectively disengages and engages the rotary coupling.

2. The apparatus of claim 1 wherein the angular position-measuring assembly includes a dual laser beam interferometer and the component is an angular reflector.

3. The apparatus of claim 1 wherein the rotary coupling of the indexing calibrator is a Hirth coupling.

4. The apparatus of claim 1 further including a blocking element coupled to the connecting member between the near and distal ends for blocking any contaminating elements from interfering with the operation of said apparatus.

5. The apparatus of claim 4 wherein the blocking element is a washer made of an elastomeric material.

6. The apparatus of claim 1 wherein the connecting member includes a spring plunger having a nose and an internal spring and the near end of the connecting member is formed with a flange having a predetermined diameter; the connecting member mounting includes a housing having an opening with a diameter smaller than said predetermined diameter; the nose including front and back ends; the housing being fixedly mounted to a top surface of the bracket; the flange and the nose being disposed inside said housing with the spring plunger being coupled to the near end of the connecting member so that the front end of the nose extends beyond the flange and contacts the top surface of the bracket; the connecting member being disposed so it passes through the opening with the distal end extending outside of the housing;

wherein for a first situation, the back end of the nose is pressed against and compresses the internal spring thereby producing a reaction spring force which is transmitted by the connecting member for urging the flange against the housing and which is at a magnitude for inhibiting the housing from rotating around the connecting member; and wherein for a second situation, an opposing force is applied to the front end of the nose at a location where it contacts the top surface of the bracket; the force having a magnitude at least greater than and applied in a direction opposite to the reaction spring force so that the flange is no longer urged against the housing and the housing is thereby permitted to rotate about the connecting member at said location where the front end of the nose contacts the top surface.

7. The apparatus of claim 6 wherein the angular position-measuring assembly includes a dual laser beam interferometer and the component is an angular reflector.

8. The apparatus of claim 7 wherein the rotary coupling of the indexing calibrator is a Hirth coupling.

9. The apparatus of claim 8 wherein the Hirth coupling includes gear teeth that precisely mesh with one another when the Hirth coupling is engaged; and the reaction spring force has a prescribed magnitude which is less than a force that will damage any of the gear teeth if the Hirth coupling is being engaged when the gear teeth are in an offset alignment with respect to one another.

10. The apparatus of claim 9 further including a blocking element coupled to the connecting member between the near and distal ends for blocking any contaminating elements from interfering with the operation of said apparatus.

11. The apparatus of claim 10 wherein a washer is disposed intermediate the flange and the housing for providing a frictional resistance for combining with the reaction spring force during said first situation and thereby reducing the magnitude of the reaction spring force for inhibiting rotational motion of the housing about the connecting member.

12. The apparatus of claim 10 wherein the blocking element is a washer made of an elastomeric material.

13. The apparatus of claim 8 wherein a bearing block being made of an abrasion resistant material is mounted to the top surface of the bracket for contacting the nose of the spring plunger and for being a bearing surface in the second situation when the housing rotates about the connecting member at the location where the nose contacts the bearing block.

14. A method for making rotary axis calibration of a machine tool assemblage, wherein the machine tool assemblage includes a machine table operable for rotating around a rotary axis, an accessory mounting, and a tool spindle including a tool holder and being operable to move back and forth along a direction parallel to the rotary axis while maintaining a fixed rotary position, the method comprising the steps of:

operating an angular position-measuring optical assembly which includes a component;

coupling the component to the machine table for measuring differences between an actual angular position of and a prescribed angular position for the machine table;

providing an indexing calibrator having upper and lower elements for rotating about a longitudinal axis of the calibrator and for being connected to one another via a rotary coupling for precise rotary positioning of the elements with respect to one another; the upper element being disposed for moving along the longitudinal axis and for engaging and disengaging the rotary coupling; the lower element having a mount for fixed coupling to the accessory mounting of the machine table;

providing a bracket having a mount for fixed coupling to the component of the angular position-measuring assembly and further including top and bottom surfaces; the bottom surface being coupled to the upper element of the calibrator;

providing a connecting member having near and distal ends; the distal end being adapted for fixed coupling to said tool holder; and providing a connecting member mounting for coupling the near end of the connecting member to the top surface of the bracket; the connecting member mounting being so constructed and arranged that the bracket is (a) restrained from rotating about the longitudinal axis when the rotary coupling of the indexing calibrator is disengaged, and (b) permitted to rotate about the longitudinal axis when the rotary coupling of the indexing calibrator is in the process of being engaged;

wherein said apparatus when used for rotary calibration is disposed such that the connecting member is coupled to the tool holder, the component is coupled to the bracket, the indexing calibrator is coupled to the machine table with the longitudinal axis of the calibrator being substantially coincident with the rotary axis of the machine table, and the back and forth motion of the spindle respectively disengages and engages the rotary coupling.

15. The method of claim 14 further comprising the steps of providing a dual laser beam interferometer with the optical assembly; using an angular reflector as the component; and providing a Hirth coupling as the rotary coupling.

16. The method of claim 14 further comprising the steps of:

configuring the connecting member to include a spring plunger having a nose and an internal spring;

configuring the near end of the connecting member with a flange having a predetermined diameter;

providing the connecting member mounting with a housing having an opening with a diameter smaller than said predetermined diameter;

providing the nose with front and back ends;

fixedly mounting the housing to a top surface of the bracket; disposing the flange and the nose inside said housing with the spring plunger being coupled to the near end of the connecting member so that the front end of the nose extends beyond the flange and contacts the top surface of the bracket; and disposing the connecting member so it passes through the opening with the distal end extending outside of the housing;

wherein for a first situation, the back end of the nose is pressed against and compresses the internal spring thereby producing a reaction spring force which is transmitted by the connecting member for urging the flange against the housing and which is at a magnitude for inhibiting the housing from rotating around the connecting member; and wherein for a second situation, an opposing force is applied to the front end of the nose at a location where it contacts the top surface of the bracket; the force having a magnitude at least greater than and applied in a direction opposite to the reaction spring force so that the flange is no longer urged against the housing and the housing is thereby permitted to rotate about the connecting member at said location where the front end of the nose contacts the top surface.

17. The method of claim 16 further comprising the step of providing a blocking element which is coupled to the connecting member between the near and distal ends and which blocks any contaminating elements from interfering with the method for making rotary axis calibration.

18. The method of claim 17 further comprising the step of providing a bearing block made of an abrasion resistant material that is mounted to the top surface of the bracket for contacting the nose of the spring plunger and is a bearing surface in the second situation when the housing rotates about the connecting member at the location where the nose contacts the bearing block.

* * * * *